(No Model.) 6 Sheets—Sheet 1.

F. EGGE.
MACHINE FOR MAKING CHAIN.

No. 507,263. Patented Oct. 24, 1893.

WITNESSES:
J. F. Finch.
A. S. Meloy.

INVENTOR
F. Egge
BY F. W. Smith Jr.
ATTORNEY (No Model.)  6 Sheets—Sheet 2.

F. EGGE.
MACHINE FOR MAKING CHAIN.

No. 507,263.  Patented Oct. 24, 1893.

WITNESSES:
J. F. Finch.
A. S. Meloy.

INVENTOR
F. Egge
BY F. W. Smith Jr.
ATTORNEY (No Model.) 6 Sheets—Sheet 3.

F. EGGE.
MACHINE FOR MAKING CHAIN.

No. 507,263. Patented Oct. 24, 1893.

WITNESSES:
A. S. Meloy.
J. Fainch.

INVENTOR
F. Egge
BY T. W. Smith
ATTORNEY

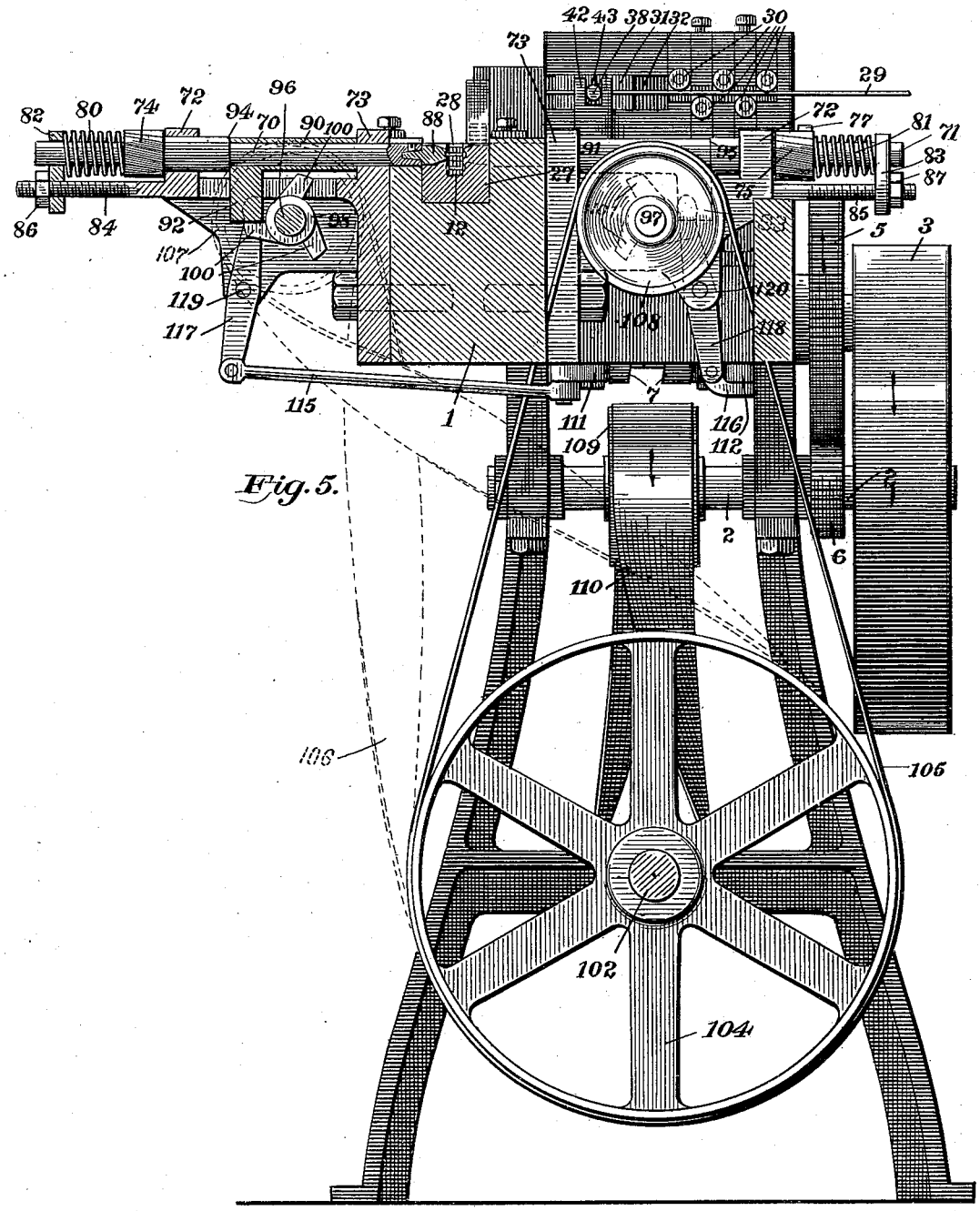

(No Model.) 6 Sheets—Sheet 6.
F. EGGE.
MACHINE FOR MAKING CHAIN.
No. 507,263. Patented Oct. 24, 1893.
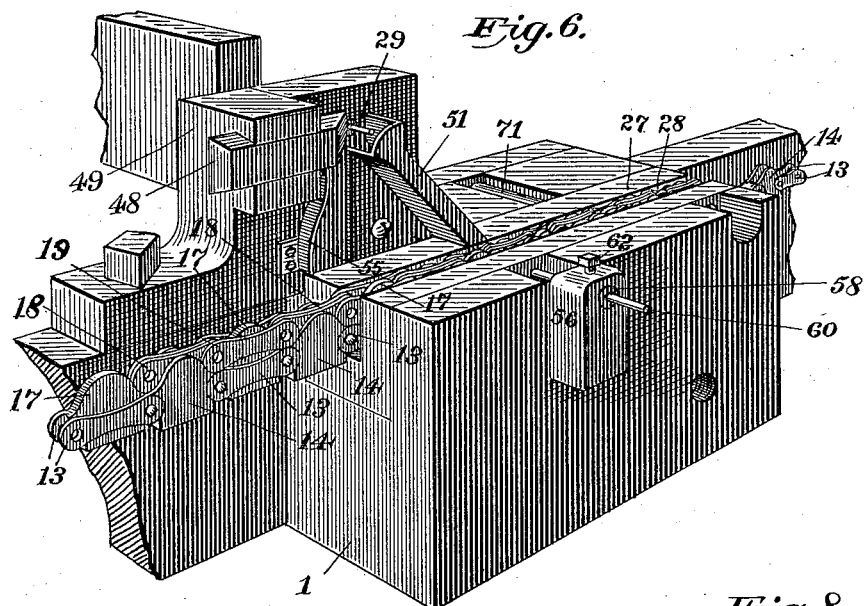
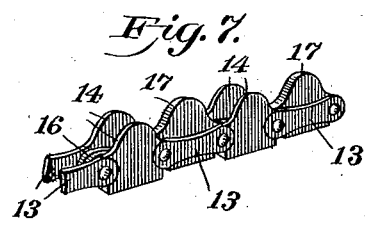
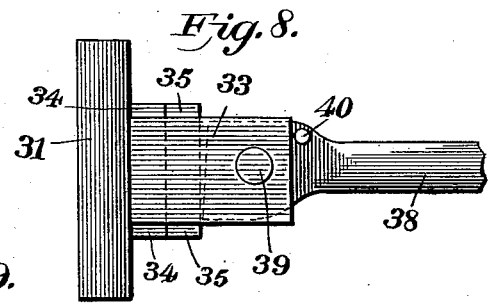
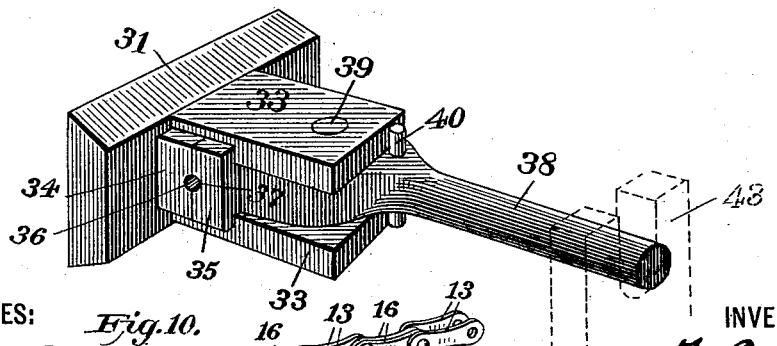
WITNESSES:
J. F. Finch.
A. S. Meloy.
INVENTOR
F. Egge
BY F. W. Smith Jr.
ATTORNEY

UNITED STATES PATENT OFFICE.

FREDERICK EGGE, OF BRIDGEPORT, CONNECTICUT.

MACHINE FOR MAKING CHAIN.

SPECIFICATION forming part of Letters Patent No. 507,263, dated October 24, 1893.

Application filed January 18, 1893. Serial No. 458,845. (No model.)

*To all whom it may concern:*

Be it known that I, FREDERICK EGGE, a citizen of the United States, residing at Bridgeport, in the county of Fairfield and State of Connecticut, have invented certain new and useful Improvements in Machines for Manufacturing Cable-Chain; and I do hereby declare the following to be a full, clear, and exact description of the invention, such as will enable others skilled in the art to which it appertains to make and use the same.

My invention relates to certain new and useful improvements in machines for making what is commonly known as "cable chain." The object of my invention is to make this chain uniformly and to reduce the cost of its production.

The operation of my machine is automatic, whereas, this chain has been heretofore manufactured wholly by hand.

Figure 1:
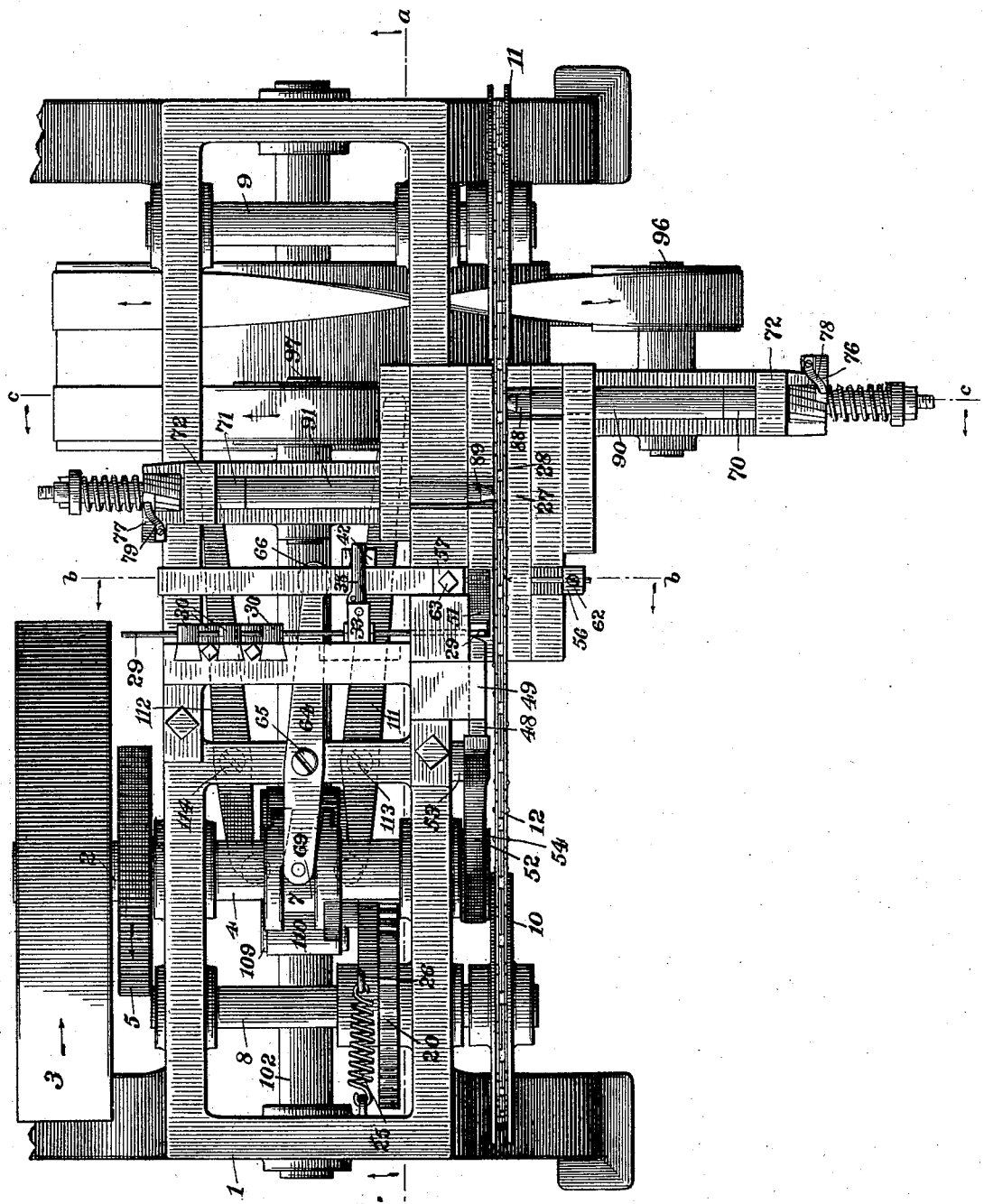
Figure 2:
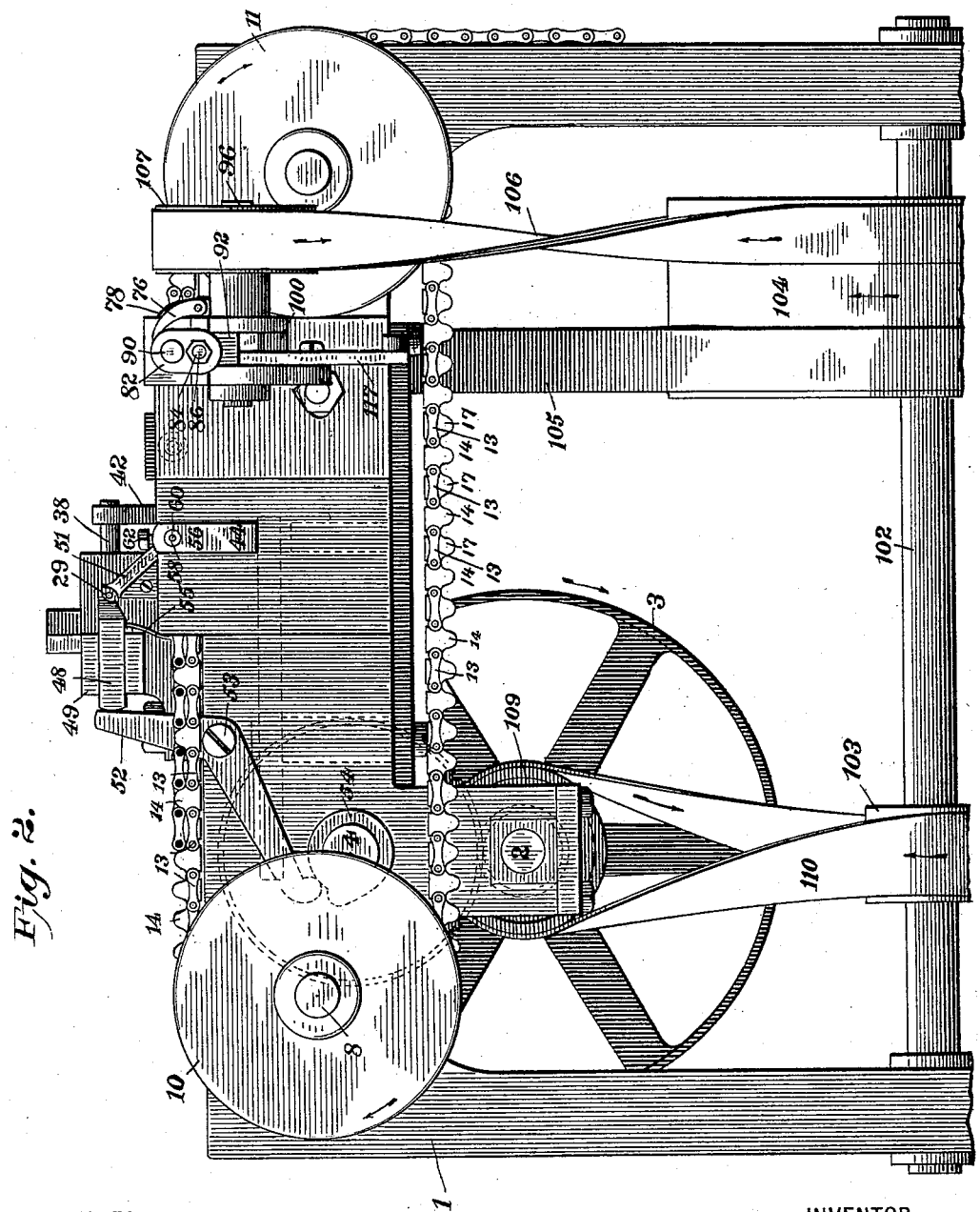
Figure 3:
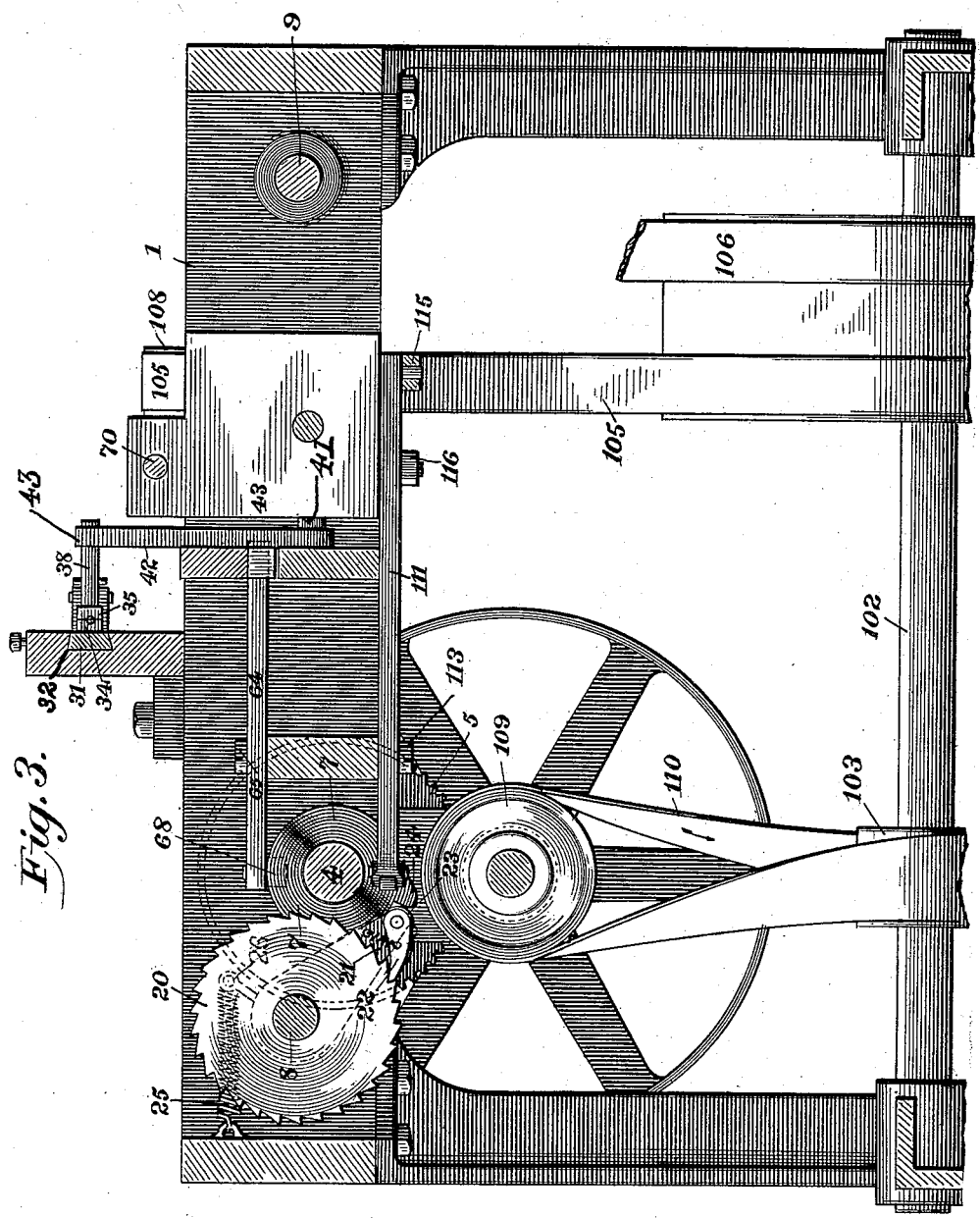
Figure 4:
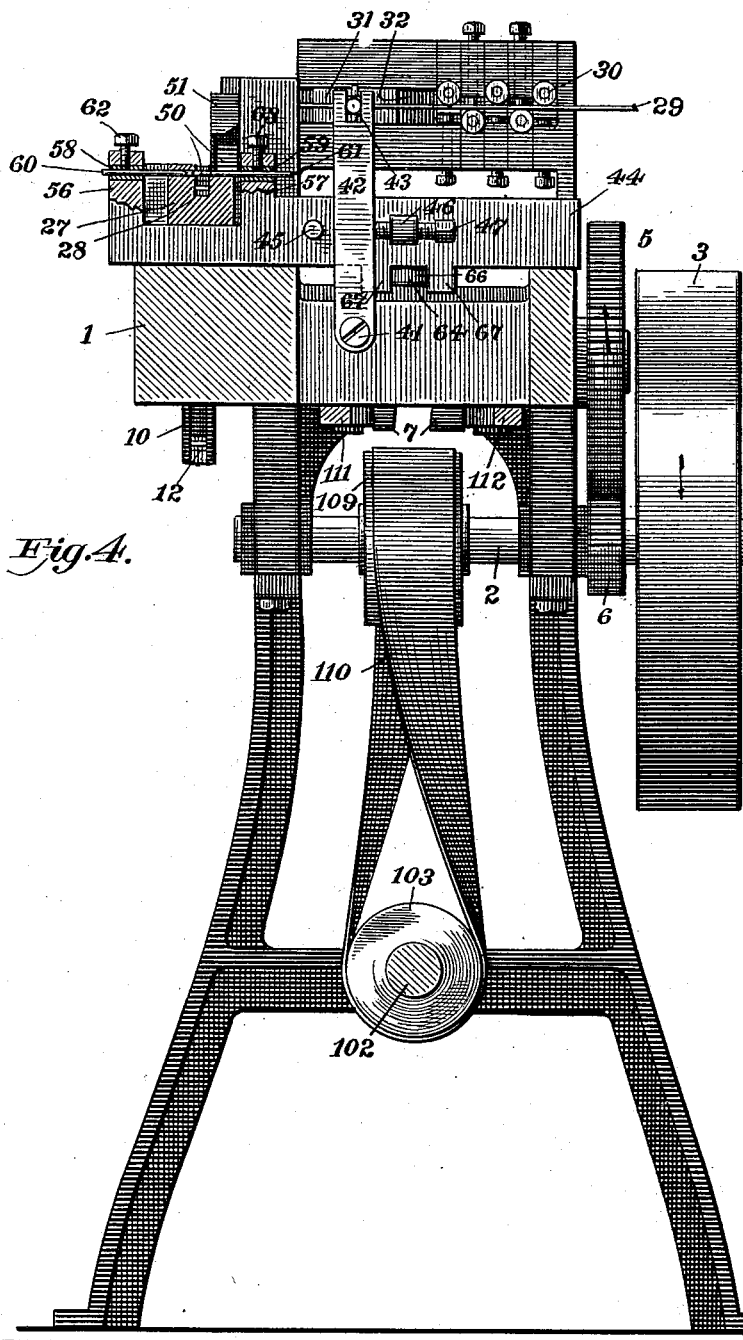

In the accompanying drawings,—Figure 1 is a plan of my machine; Fig. 2, a front elevation; Fig. 3, a section at the line $a, a$, of Fig. 1; Fig. 4, a section at the line $b, b$, of Fig. 1; Fig. 5, a section at the line $c, c$, of Fig. 1; Fig. 6, a detail broken perspective of the mechanism for guiding the links and for delivering the rivets thereto; Fig. 7, a detail perspective of the carrier chain; Fig. 8, a detail plan of the wire gripping device; Fig. 9, a detail perspective of said device, and Fig. 10, a detail perspective of a short section of the completed chain.

Similar numbers denote like parts in the several figures.

My machine comprises in its organization, instrumentalities for properly assembling the chain links and for carrying them to the point where the rivets are introduced, means for inserting the rivets through the links, whereby the latter are connected, and mechanism for heading the rivets.

I will first describe the means which I employ for feeding the links.

1 is the frame of the machine, and 2 the main shaft journaled therein with power pulley 3 thereon.

4 is a secondary shaft journaled in the frame and having mounted thereon a large spur-gear 5 which meshes with a small spur gear 6 in the shaft 2, whereby a comparatively slow speed is imparted to said shaft 4. Rigid on the shaft 4 is a compound cam 7, hereinafter to be more fully described.

8 is a shaft journaled in one end of the frame, and 9 is a shaft similarly journaled in the other end of said frame. These shafts 8, 9, project beyond the side of the frame and carry sprocket wheels 10, 11.

12 is an endless chain carried by said wheels. This chain I shall hereinafter term the "carrier chain" since the links are properly assembled thereon preparatory to being carried thereby to the riveting mechanism. I have shown and I prefer to use for this purpose a chain similar to the chain to be manufactured by my machine, since I can thereby obtain an accurate gage which greatly facilitates the proper assembly of the links. I however, in constructing the carrier, introduce between the adjacent ends of the outside links 13, ears 14 which rise in pairs above the chain and are coupled below the latter by an integral portion 15, while between the adjacent ends of the inside links 16 I introduce single ears 17, these ears 14, 17, in the completed carrier, being arranged alternately, as will be readily understood from Figs. 7 and 10.

The links of the chain to be made I will hereinafter call "chain-links" in contradistinction to the links of the carrier which I will term "carrier links." These chain links are placed by hand on the carrier, the inside links being confined laterally by the ears 14 and at the ends by the ears 17, while the outside links are confined at their ends by the ears 14 and separated a proper distance (equal to the combined thickness of the inside links) by the ears 17. The chain links are pierced for the rivets and tumbled to remove the burr (caused by blanking them out) prior to being placed on the carrier, and in this connection I will say that it would be a very ordinary mechanical expedient to arrange chutes or wells leading from the blanking dies to a point immediately above the carrier, whereby the chain links could be automatically deposited on the carrier in proper relative position. A vital objection to this arrangement exists, namely, the burr on the links which is thrown up by the blanking dies. As long as this burr is present on the link it is impossible to manufacture from such links a suitable and serviceable chain, and I prefer, therefore, to assemble the links manually on the carrier.

In order to advance the carrier chain intermittingly, step by step, I mount a ratchet wheel 20 on the shaft 8, and suspend loosely from said shaft a pawl carrier 21 which projects beyond said wheel and has pivoted on one side a spring pawl 22 adapted to engage with said ratchet, and on the other side a friction roll 23 against which latter a toe 24 extending from the cam 7 abuts to throw the carrier 21 downward, thereby turning said wheel, all of which will be readily understood by reference to Figs. 1 and 3.

A coil spring 25 connected to the frame and to a pin 26 projecting upwardly from the carrier 21 operates to return said carrier to normal position.

27 is a guide block secured in the frame of the machine and having a channel 28 of a width sufficient to contain the carrier chain with the loose links thereon, said chain and links fitting snugly in said block, whereby disarrangement of the links is prevented. During the passage of the carrier chain through this block the rivets are inserted through the links and then headed. I have provided mechanism for cutting off these rivets from a continuously fed wire, and for delivering said rivets in proper position preparatory to their insertion through the links, and I will now describe such mechanism in detail.

29 is the wire which is led through ordinary straightening rolls 30.

31 is a block adapted to slide freely within a way 32 in the frame and having extending outwardly therefrom ears 33, and between the latter are independent clutch blocks 34, 35, which have complementary elongated circular grooves 36, 37, in their inner meeting faces.

38 is a lever pivoted at 39 between the ears 33 and having its inner end cam-shaped, as shown in dotted lines in Fig. 8, so that when said lever is swung forward it will operate to close the clutch blocks 34, 35, and on the reverse movement of said lever said blocks will be free to open. A pin 40 through said lever acts as a stop which abuts against the ears 33 and prevents any overthrow of the lever and consequent closing of the blocks on this reverse movement of the lever.

Pivoted to the frame at 41 is a vertical lever 42 having a fork at 43 at the upper end which embraces the lever 38, as shown at Fig. 4.

44 is a slide which is capable of free reciprocation within suitable ways in the frame and has extending therefrom on opposite sides of the lever 42, studs 45, 46. Extending through the stud 46 toward the lever 42 is a screw bolt 47.

From the foregoing it will be clear that when the part 44 slides back and forth the stud 45 and bolt 47 will alternately abut against the lever 42 and swing it in opposite directions thereby effecting the reciprocation of the block 31. The wire is led through the clutch-blocks 34, 35, so that it will be readily understood that when the lever 38 is carried forward by the lever 42, the blocks will grip the wire and feed it along, while, on the other hand, the blocks will be released and will be free to slide along the wire when said levers move in the opposite direction.

48 is a cutter which slides within suitable ways within a block 49 extending laterally from the frame. As the wire is fed forward it is projected through and beyond the wall of the frame, and the arrangement of said block is such that at its forward movement it will cut off the wire by a shear cut close to said wall. The rivets 50, thus made by cutting off the wire, fall successively into a chute 51 which leads them to the device for properly assembling them within the chain links. The reciprocation of the cutter is effected by means of a bell-crank 52 pivoted at 53 to the frame, the upper end of said crank abutting against the rear end of said cutter while the lower end rests against a cam 54 on the shaft 4.

55 is a spring secured to the frame and bearing against the forward part of the cutter whereby the latter is normally retracted. The bottom of the chute 51 is directly opposite to and in alignment with the pierced openings in the links.

The reciprocatory slide 44 extends beneath the guide block 27 and has turrets 56, 57, which rise on opposite sides of said block. Within these turrets are suitable bushings 58, 59, and through these bushings extend pins 60, 61, confined by set screws 62, 63. These pins are in alignment with the bottom of the chute and with each other. The pin 60 has a conical point at its end and the block 27 is perforated to admit both pins during the reciprocation of the slide 44. As the slide 44 moves inward the pointed pin 60 will enter the holes in the links and render the alignment of said holes perfectly true, and at the same time a rivet will drop to the bottom of the chute in front of the pin 61, while at the outward movement of said slide, the pin 61 will push the rivet within the holes in the chain links preparatory to the operation of the riveting mechanism. The means for actuating the slide 44 comprise a lever 64 pivoted at 65 to the frame, one end of said lever being rounded, as seen at 66 and extending between lugs 67 which depend from the slide, the other end provided with a shoe 68 (shown in dotted lines at Fig. 3) which projects within a cam-groove 69 in the compound cam 7, and as the cam revolves lateral reciprocation will be imparted to the lever 64, thereby effecting the movements of said slide.

I will now describe the mechanism for heading the rivets after the latter have been assembled within the links.

70, 71, are bars which are journaled within suitable bearings 72, 73, on opposite sides in the frame in such manner as to be capable of both rotary movement and lengthwise reciprocation.

74, 75, are ratchet hubs secured on said bars near the outer ends thereof, and 76, 77, are pawls pivoted to the frame and backed by springs 78, 79, which pawls are in engagement with the ratchets, so that when the bars 70, 71, are moved lengthwise, the action of the teeth on the pawls will operate to turn the bars axially.

80, 81 are coil springs around the outer ends of the bars and confined between the ratchets and plates 82, 83, respectively.

84, 85, are threaded bolts which extend outwardly from the frame immediately below the outer ends of the bars. The plates 82, 83, are supported around these bars and bolts so as to slide freely thereon.

86, 87, are nuts driven on the bolts 84, 85, against the said plates, whereby the springs 80, 81, may be more or less normally compressed in order to increase or decrease the striking force of the bars at their inward movements.

88, 89, are riveting heads secured to the inner ends of the bars and extending through the guide-block 27 on opposite sides of the channel therein.

90, 91 are sleeves loose around the bars 70, 71, and having lugs 92, 93, depending therefrom. These sleeves are confined at their outer ends by shoulders 94, 95, on the bars, while the inner ends of said sleeves act as stops which abut against the bearings 73 whereby the inward movement of said bars is limited, for the purpose of insuring uniformity in the formation of the rivet heads and to prevent the jamming of the links. Journaled in the frame at points immediately behind these lugs 92, 93, are short shafts 96, 97, on which latter are secured striker wheels which comprise hubs 98, 99, having projecting therefrom arms 100, 101.

102 is a shaft journaled at the bottom of the frame and having mounted thereon a small pulley 103 and a large pulley 104, the latter having around it two belts 105, 106.

107, 108, are small pulleys secured on the shafts 96, 97, and around these pulleys the belts 105, 106, are run, the latter belt being twisted in order that the striker arms 100 may be thrown toward the lug 92.

Mounted on the main shaft 2 is a pulley 109 which is belted to the pulley 103 by belt 110.

The lugs 92, 93, are within the field of action of the striker arms 100, 101, and as the latter revolve they will throw back the bars, and then release them to allow the springs 80, 81, to drive said bars inward whereby the heads are formed on the rivets.

As riveting mechanisms are well known, and since I do not lay claim to any improvement in such mechanisms, and for the further reason that any riveting mechanism will subserve the purpose of my invention, I do not deem it necessary to go into further details in this connection.

The operation of riveting occurs while the carrier chain links are stationary, and it therefore becomes necessary to suspend the action of the riveting bars during the time when said carrier and links are traveling. To this end I provide two levers 111, 112, pivoted at 113, 114, to the frame, and embracing the cam 7 at their heel ends, while their forward ends are respectively pivoted to pitmen 115, 116, the other ends of the latter being pivoted to the lower extremities of retractor bars 117, 118. These retractor bars are vertically disposed and are pivoted respectively at 119, 120, to the frame, the upper ends of said bars resting against the inner walls of the lugs 92, 93.

The cam operates to contract the forward ends of the levers 111, 112, thereby causing the retractor bars to force back the lugs without the field of action of the arms 100, 101, and the action of said cam is such that the lugs are held in this position at all times except when the carrier chain is stationary.

The operation of my improvement is as follows: The carrier with the links properly assembled thereon brings the latter into position with the rivet holes opposite to the pins 60, 61, the pin 60, brings said holes into perfect alignment, and the pin 61 pushes a previously cut rivet within said holes. The links are then carried forward and brought to a standstill with the rivets opposite to the heads of the riveting bars, and the latter then operate to form heads on each end of the rivets. The walls of the channel 28 serve as anvils against which the riveting is done, while the riveting bars themselves are arranged one in advance of the other so that while the bar nearest the rivet inserting devices is operating to form the heads on one side of the rivets, the farthermost bar is operating to form the heads on the other side of the rivets that have been previously headed on one side. During this heading of the rivets, the pins 60, 61, are operating to perform their functions on subsequent links. Simultaneously with the intermittent movements of the carrier chain, the lugs 92, 93, are forced back by the retractor bars 117, 118, out of reach of the striker arms, so that until said chain again becomes stationary the riveting bars will be idle, but, at the same time with the stopping of the chain, the retractor bars will be drawn back and the riveting bars again brought into action.

The wire is fed and cut off into rivets by the mechanisms and in the manner hereinbefore described, and such rivets drop into the chute 51, thereby affording a constant automatic supply of rivets.

I claim—

1. In a machine for manufacturing cable chain, the combination with means for feeding the chain links assembled in proper relative position, of appliances for cutting off the rivets and delivering them into proper position relative to the links, the mechanism for inserting the rivets within said links, and means for forming heads on the ends of the rivets so inserted, substantially as set forth and described.

2. In a machine for making cable chain, the combination of automatically controlled mechanisms for feeding the chain links properly assembled preparatory to riveting, for inserting the rivets within said links, for heading said rivets after such insertion, and for suspending the operation of the rivet inserting and heading mechanisms, during the feeding of the links, substantially as set forth.

3. The herein described means for carrying the chain links, comprising a chain like the article to be manufactured, said chain having two ears rising between the adjacent ends of the outer links, and single ears rising between the adjacent ends of the inner links, substantially as set forth.

4. The combination of the carrier chain provided with ears as described whereby the chain links may be properly assembled on said carrier, the guide block having a channel within which the links thus assembled are carried, means for intermittingly feeding said carrier chain, means for inserting the rivets within the links while the latter are stationary within the guide block, and means for simultaneously heading previously inserted rivets, substantially as shown and described.

5. The combination of the guide block having therein a channel for the passage of the chain links and provided with perforations leading into said channel from opposite sides thereof, the chute whose bottom is in alignment with said perforations, means for feeding the wire to a point immediately over the mouth of the chute, and devices for cutting off said wire into rivets which drop into said chute, substantially as set forth.

6. The combination of the guide block having a channel for the passage of the carrier chain and the links superimposed thereon and provided with perforations leading in alignment with each other into said channel from opposite sides of the block, the reciprocatory slide carrying pins in alignment with said perforations, means for delivering the rivets in front of one of said pins, and mechanism for actuating said slide whereby the pins will successively enter the pierced holes in the links to bring them into proper alignment and to insert the rivets, substantially as shown and described.

In testimony whereof I affix my signature in presence of two witnesses.

FREDERICK EGGE.

Witnesses:
F. W. SMITH, Jr.
J. S. FINCH.